United States Patent [19]
Boehde et al.

[11] Patent Number: 5,502,984
[45] Date of Patent: Apr. 2, 1996

[54] NON-CONCENTRIC OIL SEPARATOR

[75] Inventors: Michael C. Boehde, Onalaska; Dennis M. Beekman, La Crosse, both of Wis.

[73] Assignee: American Standard Inc., Piscataway, N.J.

[21] Appl. No.: 264,832

[22] Filed: Jun. 23, 1994

Related U.S. Application Data

[63] Continuation-in-part of Ser. No. 153,709, Nov. 17, 1993, abandoned.

[51] Int. Cl.$^6$ .............................. F25B 43/02; B01D 21/26
[52] U.S. Cl. ...................... 62/470; 55/459.1; 210/512.1
[58] Field of Search .................. 210/168, 512.1; 55/450, 459.1; 62/503, 470, 471, 473

[56]     References Cited

U.S. PATENT DOCUMENTS

| | | | |
|---|---|---|---|
| 1,531,602 | 3/1925 | Folker | 55/459.1 X |
| 2,316,016 | 4/1943 | Packie | 55/458 |
| 3,520,149 | 7/1970 | Uratani | 62/470 |
| 3,778,984 | 12/1973 | Lawser | 62/470 |
| 4,070,168 | 1/1978 | Beattie | 55/205 |
| 4,506,523 | 3/1985 | DiCarlo et al. | 62/470 |
| 4,624,691 | 11/1986 | Schneider | 55/459.1 X |
| 5,029,448 | 7/1991 | Carey | 62/84 |

FOREIGN PATENT DOCUMENTS

| | | | |
|---|---|---|---|
| 0861895 | 9/1981 | U.S.S.R. | 62/470 |

*Primary Examiner*—William E. Wayner
*Attorney, Agent, or Firm*—William J. Beres; William O'Driscoll; Peter D. Ferguson

[57]        ABSTRACT

An oil separator for a refrigeration system employing a screw compressor includes a generally cylindrical, vertically upstanding housing the bottom of which defines an oil sump and the top of which is penetrated by discharge conduit connecting the oil separator to the refrigeration system condenser. The center line of the discharge conduit is parallel to but offset from the center line of the separator housing so that the discharge conduit is non-concentric with the housing. As a result, an enlarged tangential inlet to the interior of the separator is made possible which is unimpeded by the discharge conduit. The cross sectional flow area through which the mixture discharged from the compressor passes prior to entering the separator can therefore likewise be increased. As a result, pressure drop in the refrigerant gas as a result of the oil separation process is reduced and overall system efficiency is enhanced while the diameter of the separator housing is minimized.

21 Claims, 3 Drawing Sheets

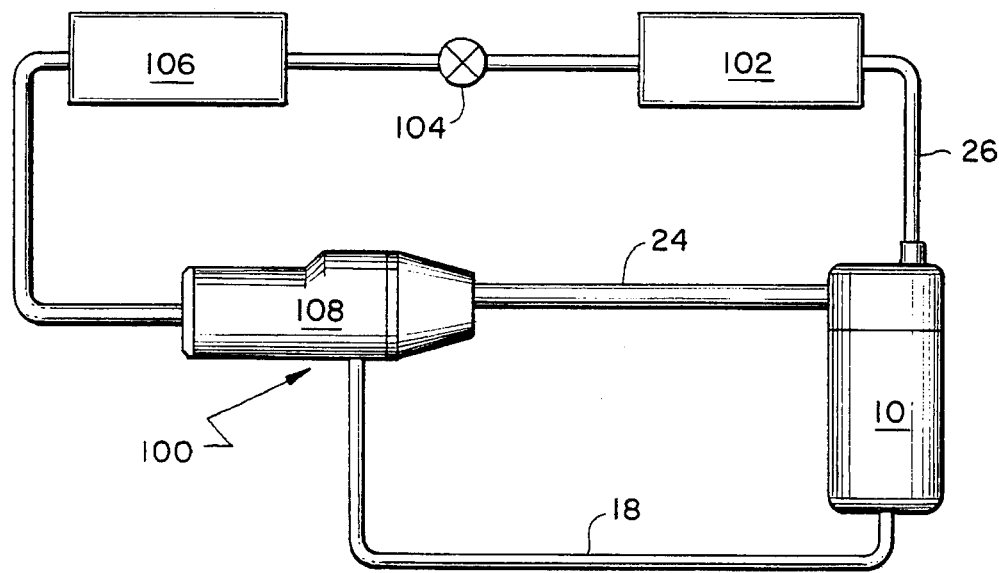
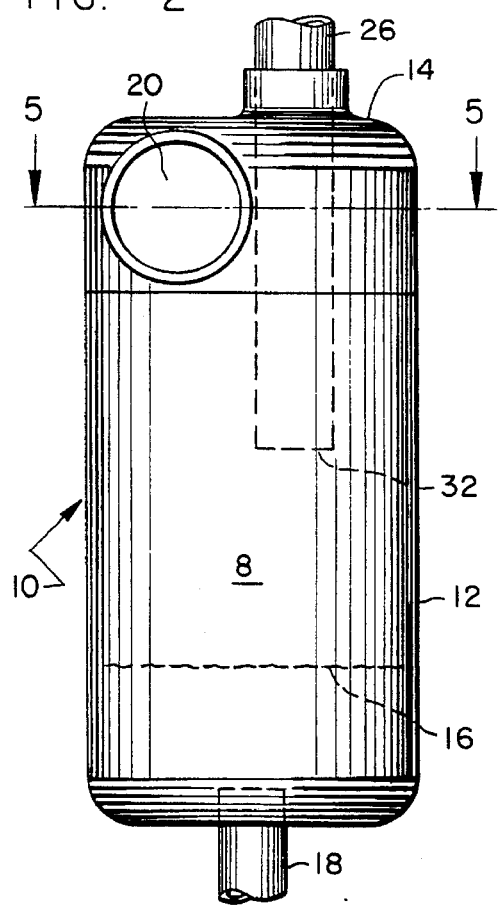
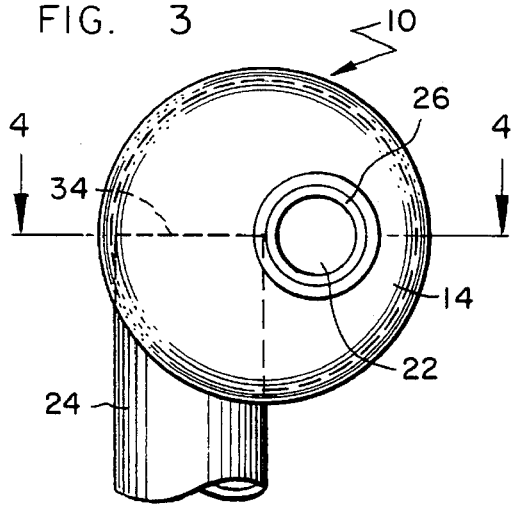

5,502,984

NON-CONCENTRIC OIL SEPARATOR

This continuation-in-part patent application derives from U.S. patent application Ser. No. 08/153,709, filed Nov. 17, 1993, now abandoned.

BACKGROUND OF THE INVENTION

The present invention relates generally to the compression of a refrigerant gas into which a liquid has been injected during the compression process. More particularly, the present invention relates to the requirement to separate entrained oil from the refrigerant gas-oil mixture discharged from an oil-injected screw compressor in a refrigeration system.

Compressors used in refrigeration systems raise the pressure of a refrigerant gas from a suction to a discharge pressure thereby permitting the refrigerant to be used within the system to cool a desired medium. Many types of compressors, including rotary screw compressors, are employed to compress the refrigerant gas in such systems.

In a screw compressor, two complimentary rotors are located in the working chamber of a rotor housing. The housing has a low pressure end defining a suction port and a high pressure end defining a discharge port. Refrigerant gas at suction pressure enters the low pressure end of the compressor's working chamber through the suction port and is enveloped in a pocket formed between the counter-rotating screw rotors. The volume of the gas pocket decreases and the pocket is circumferentially displaced to the high pressure end of the working chamber as the compressor rotors rotate and mesh.

The gas within such a pocket is compressed and heated by virtue of the decreasing volume in which it is contained prior to the pocket's opening to the discharge port. The pocket, as decreases in volume, eventually opens to the discharge port at the high pressure end of the rotor housing where the compressed gas is discharged.

Screw compressors used in refrigeration applications will, in the majority of instances, include an oil injection feature. Oil is injected into the working chamber in relatively large quantity (and therefore into the refrigerant gas being compressed) for several reasons. First, the injected oil acts to cool the refrigerant gas undergoing compression. As a result, the intermeshed rotors are cooled allowing for tighter tolerances between them.

Second, the oil acts as a lubricant. One of the two rotors in a screw compressor is typically driven by an external source such as an electric motor. The mating rotor is driven by virtue of its meshing relationship with the externally driven rotor. The injected oil prevents excessive wear between the driving and driven rotors and is additionally delivered to various bearing surfaces within the compressor for lubrication purposes.

Finally, oil injected into the working chamber of a screw compressor acts as a sealant between the rotors themselves and between the rotors and the wall of the working chamber for the reason that there are no discrete seals between the individual rotors or between the rotors and the rotor housing. Absent the injection of oil, significant leakage paths would exist which would be detrimental to compressor efficiency. Oil injection therefore both increases the efficiency and prolongs the life of the screw compressor.

Oil making its way into the working chamber of a screw compressor is, for the most part, atomized and becomes entrained in the refrigerant undergoing compression. Such oil must, to a great extent, be removed from the oil-rich refrigerant gas discharged from the compressor in order to make the oil available for return to the compressor for the purposes enumerated above. Further, removal of excess oil from the compressed refrigerant gas must be accomplished to ensure that the performance of the gas is not unduly affected within the refrigeration system by the carrying of an excess amount of oil into and through the system heat exchangers.

Previous apparatus by which cyclonic oil separation is accomplished is illustrated in U.S. Pat. Nos. 4,070,168; 4,506,523 and 5,029,448. The latter is assigned to the assignee of the present invention.

The '168 patent is directed to a liquid-gas separator the function of which is to separate entrained gas from a liquid such as crude oil through the use of a scroll housing. The path followed by the mixture within the separator is of ever increasing width.

The '523 patent is thought to be typical of many previous "cyclone"-type oil separators. It is, however, quite distinct from the oil separator of the present invention, as will come to be understood, by its use of concentric discharge gas conduit. In the case of the '523 patent, the discharge conduit through which the separated refrigerant gas exits the separator is concentric with the separator housing and is of enlarged diameter interior of the separator housing.

Finally, the '448 patent, like the '523 patent, is, with respect to individual ones of its legs, suggestive of the earlier known and commonly used cyclone-type oil separators in which a vortex action is induced into a fluid stream for oil separation purposes. The separator of the '448 patent is unique with respect to its separation of the inlet mixture into two discrete streams for delivery to different locations within the separator where centrifugal oil separation processes occurs.

The need continues to exist for a more efficient "cyclonic" oil separator which is particularly suited for use with refrigeration compressors of the screw type.

SUMMARY OF THE INVENTION

It will be appreciated that a primary object of the present invention is to separate an entrained liquid, such as oil, from a liquid-gas mixture.

It is another object of the present invention to separate a liquid from a gas in apparatus having no moving parts.

It is a further object of the present invention to provide for the separation of oil from compressed refrigerant gas in a manner which eliminates the need for a separate oil sump in an associated refrigeration compressor.

It is a still further objection of the present invention to remove a predetermined amount of liquid from a liquid-gas mixture using centrifugal force.

It is a primary object of the present invention to provide for the separation of refrigerant gas and oil in a refrigeration system in a manner which reduces pressure loss in the gas thereby improving the efficiency of the refrigeration system overall.

Finally, it is another primary object of the present invention to provide a compact liquid-gas separator of the cyclone type which, by the provision of a larger unimpeded inlet through the use of non-concentric discharge piping, results in the efficient separation of oil from refrigerant gas in a manner which both minimizes the pressure drop in the gas and permits the separator dimensions to be maintained less than those which would cause the separator to be considered a pressure vessel under ASME standards.

The oil separator of the present invention contemplates a cylindrical vertically upstanding housing which is capped at its upper end. The cap, which may be a distinct part of or integral with the housing, defines an inlet for the refrigerant gas-oil mixture received from a screw compressor and a refrigerant gas outlet penetrated by discharge conduit connecting to the refrigeration system condenser.

The cap, like the housing, is generally cylindrical in nature and circular in cross section. The discharge outlet defined by the cap is non-concentric with respect to the centerline of the cap's circular cross section so that the discharge conduit is non-concentric with respect to the centerline of the separator housing.

As will be appreciated, by the use of non-concentric discharge piping, the inlet to the oil separator can be enlarged, yet still be unimpeded by the discharge conduit, thereby permitting an increased cross-sectional flow area for the refrigerant gas-oil mixture received from the compressor. As a result of the increased flow area, the pressure drop in the refrigerant gas as it passes into, through and out of the separator is reduced as compared to earlier separators of like housing diameter having concentric discharge piping.

As will further be appreciated, in order to obtain the same unimpeded inlet flow area in separators where the discharge piping is concentric with the separator housing, the use of a housing of increased diameter would be required possibly causing the separator to become subject to ASME requirements relating to pressure vessels. By maintaining the diameter of the separator housing less than the diameter at which ASME pressure vessel requirements come into play, significant performance, fabrication and cost advantages are achieved by the oil separator of the present invention.

As will still further be appreciated, pressure drop characteristics in the present invention are enhanced by the definition of an enlarged inlet at the distal end of the discharge piping interior of the separator housing. The definition of an enlarged transitional entryway to the discharge piping interior of the separator housing reduces the pressure drop which would otherwise occur at that location if a transitional entryway were not provided for. The enlarged entryway also serves to enhance the oil separation process by causing the mixture of gas and lubricant passing through the separator to be urged radially outward to the interior wall of the separator housing and by increasing the velocity thereof due to the constriction in the flow area it represents.

The efficacy and physical characteristics of the oil separator of the present invention can still further enhanced by the disposition of a baffle in the separator housing which divides the interior of the housing into two chambers. Lubricant separation occurs in the upper chamber while lubricant collection and holding is accomplished in the lower chamber. Use of the baffle advantageously shortens the oil separator by reducing the required interior height of the separator housing needed to achieve good oil separation results.

Still other advantages of the present invention are with respect to the dual function of the discharge piping which can be the piping which already exists in the refrigeration system as the conduit which connects the compressor to the condenser (via the oil separator). Still another advantage of the oil separator of the present invention is the fact that it is conducive for use with compressors of varying capacity by appropriately sizing the length of the separator housing.

As will be appreciated, however, the primary advantage of the present invention is in its reduction of the pressure drop in the refrigerant gas flowing through it while maintaining a separator housing diameter which is less than that which would cause the separator to be considered an ASME pressure vessel.

DESCRIPTION OF THE DRAWING FIGURES

FIG. 1 schematically illustrates a refrigeration system according to the present invention.

FIG. 2 is a perspective view of the oil separator of the present invention.

FIG. 3 is a top view of the oil separator of the present invention.

DESCRIPTION OF THE PREFERRED EMBODIMENT

Figure 4:
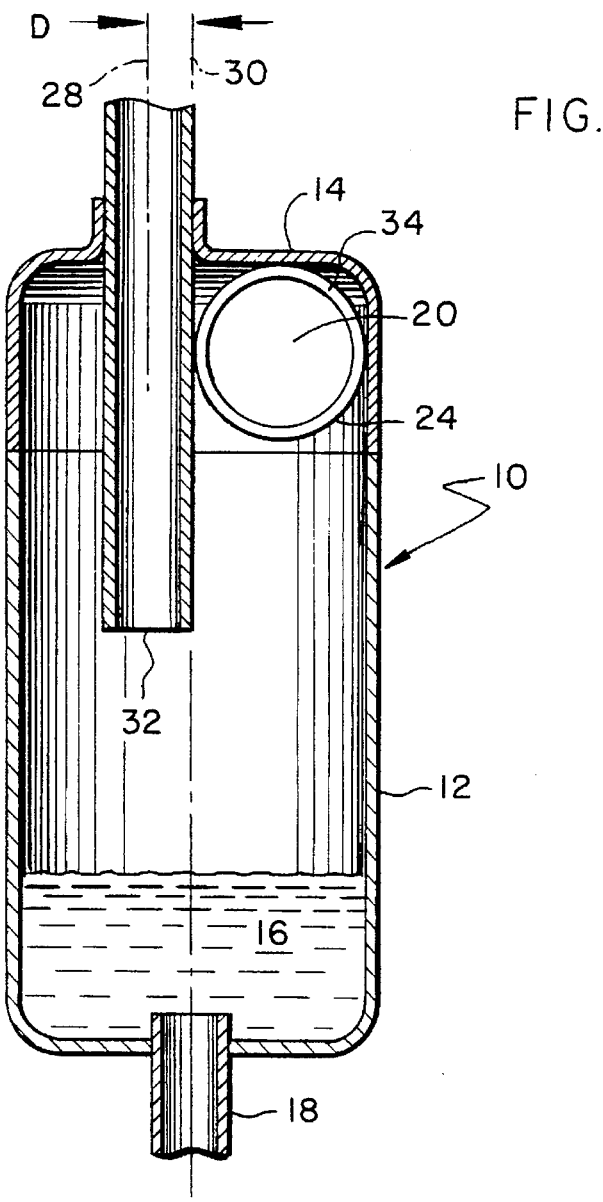
FIG. 4 is a cross-sectional view of the separator taken along line 4—4 of FIG. 3.
Figure 5:
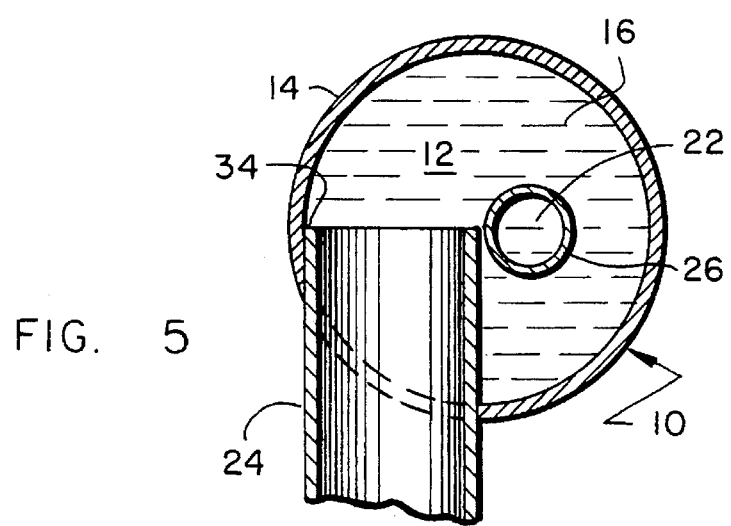
FIG. 5 is a cross-sectional view of the oil separator of the present invention taken along line 5—5 of FIG. 2.

Referring initially to FIG. 1, refrigeration system 100 includes a condenser 102 from which condensed refrigerant is delivered through a metering device 104 to an evaporator 106. Vaporized refrigerant is delivered from evaporator 106 to compressor 108 which is preferably a rotary screw compressor. Compressor 108 discharges a mixture of compressed refrigerant gas and entrained oil to oil separator 10 which, as will further be described, separates the oil from the mixture. Gas from which the oil has been disentrained by separator 10 is delivered to condenser 102 to complete the refrigeration circuit while the separated oil is redelivered to the compressor for the purposes enumerated above.

Referring concurrently now to all of the drawing figures, oil separator 10 is comprised of a vertically upstanding cylindrical housing 12 the upper portion of which is closed by a cap 14. Housing 12 defines a sump 16 to which the oil separated from the refrigerant gas-oil mixture entering separator 10 drains. The separated oil is deliverd from sump 16 to compressor 108 via conduit 18.

Cap 14 of housing 12 defines an inlet 20 and a discharge outlet 22. Inlet 20 is penetrated by or attached to conduit 24 through which the mixture of compressed refrigerant gas and entrained oil is communicated from compressor 108 to separator 10. As will be appreciated from the drawing figures, conduit 24 passes through inlet 20 and penetrates into the interior of the oil separator. It should be noted, however, that as is illustrated in the '448 patent, which is incorporated hereinto by reference, the inlet conduit may be accommodated in a formed portion of cap 14. It not necessarily required to penetrate into the interior of the separator housing. In either case, the mixture received from the compressor is tangentially discharged and enters the interior of separator 10 along its inner side wall.

Discharge outlet 22, defined in cap 14, is non-concentric with respect to the center line of cap 14. As such, discharge conduit 26 penetrates cap 14 and extends into housing 12 in a manner such that the center line of the discharge conduit is offset from and non-concentric with the center line of housing 12 and the separator as a whole.

Because discharge conduit 26 is non-concentric with respect to the center line of housing 12, inlet 20 in cap 14 can be preferentially located in the circumference of housing 12 or cap 14 so that its diameter and the cross sectional flow area it represents is enlarged. As a result, restriction of the flow of the refrigerant gas-oil mixture discharged from compressor 108 as it travels to and enters separator 10 is minimized with an attendant minimization of pressure loss in the refrigerant gas and an increase in overall system efficiency.

As is best illustrated in FIG. 4, the diameter of inlet conduit 24 can be increased by a dimension D which nominally represents the offset of the center line 28 of discharge conduit 26 from the center line 30 of oil separator 10. As will be appreciated, the diameter of inlet 20 is capable of being increased such that it is greater than one half the diameter of the separator housing yet in a manner such that the mixture entering the separator does not impact nor is its flow impeded by the discharge conduit.

It is to be noted that discharge conduit 26, the open lower end 32 of which is disposed interior of oil separator 10, penetrates into the interior of the housing to an extent such that its lower end 32 is disposed below inlet 20. As a result, end 32 of the discharge piping, the purpose of which is to communicate refrigerant gas out of the separator to the system condenser, is effectively shielded from the oil-laden refrigerant gas as it enters the interior of the separator through inlet 20 and is disposed in a region remote from the interior side wall of the separator housing where refrigerant gas from which oil has been disentrained is found.

In operation, the mixture of refrigerant gas and oil enters housing 12 tangentially through inlet 20 along the inner side wall thereof. The mixture swirls around and follows a generally spiroidal path downward and along the inside wall of the housing. As will be appreciated, since the oil entrained within the mixture is heavier than the refrigerant gas in which it is entrained, the centrifugal force created by the cyclonic flow of the mixture causes the oil to migrate radially outward and to impact, adhere to and flow downwardly, along the inner wall of the separator housing by force of gravity. The separated oil collects in sump 16.

The axially central region of housing 12 will generally contain refrigerant gas from which oil has been disentrained. Such gas enters open end 32 of discharge conduit 26 due to the continued entry of refrigerant gas in which oil is entrained into the upper region of the oil separator and as a result of the lower pressures found downstrem of the separator in the refrigeration system when it is in operation.

The oil in sump 16 is likewise forced, by the discharge pressure which exists in the interior of the oil separator whenever the compressor is operating, into conduit 18 and thence to the various locations in the compressor which require cooling, sealing and lubrication. Such locations, by design, vent or open into areas within the compressor which are at less than compressor discharge pressure.

Therefore, both oil and the refrigerant gas from which such oil has been disentrained are driven from separator 10 and delivered to the locations within the refrigeration system at which they are next used by the differential pressure which exists between the oil separator and such locations. Delivery is accomplished without the need for mechanical assistance or moving parts in or associated with the oil separator. Optionally, an oil pump (not shown) can be employed to move oil from sump 16 back to compressor 108.

It is to be noted that the oil separator illustrated in Drawing FIGS. 1–5 suggests the penetration of inlet 20 by conduit 24 with the end 34 of the conduit being located proximate discharge piping 26. It will be appreciated, however, that no portion of conduit 24 need penetrate into the oil separator since in both cases the mixture entering the housing will be unimpeded by the non-concentric discharge conduit. It is also to be noted that while in its preferred embodiment cap 14 is a discrete part of housing 12, housing 12 could be unitary in nature.

Figure 6:
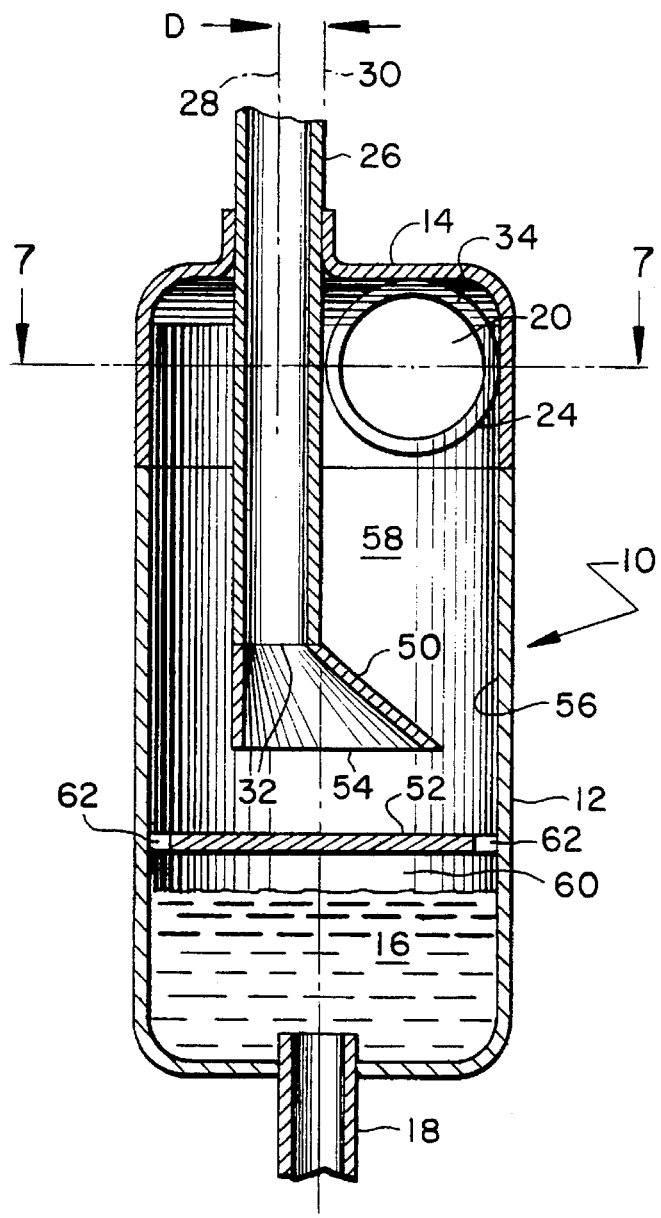
FIG. 6 is a cross-sectional view of an alternative embodiment of the present invention.
Figure 7:
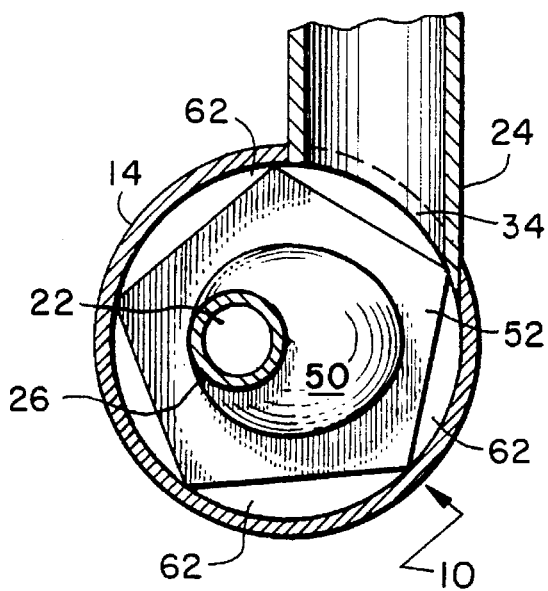
FIG. 7 is a view taken along line 7—7 of FIG. 6.

Referring now to Drawing FIGS. 6 and 7, an alternative embodiment of the present invention will be described. Essentially, it will be seen that in the FIG. 6 and 7 embodiment discharge pipe 26 has an enlarged portion 50 disposed at its lower end 32 and that a baffle member 52 is disposed between the lower end 54 of enlarged portion 50 and the surface of sump 16 defined in the bottom of housing 12. Enlarged portion 50 is a tapered or contoured transitional portion of the discharge piping which may be an integrally formed portion of the distal end of discharge pipe 26 or a separate piece attached thereto such as by welding.

By the addition to or use of transitional portion 50 with discharge conduit 26 the performance and efficiency of the oil separator is enhanced. In that regard, the reduced flow area between the radially outermost edge of enlargement 50 and the inner wall 56 of housing 12, together with the tapered depending contour of enlargement 50, serves to direct and deflect both lubricant and the refrigerant gas in which it is carried radially outward toward the inner wall of housing 12 and to increase the velocity of the gas stream. This serves to enhance the separation of entrained lubricant from the refrigerant gas by increased impingement of the oil with the separator structure while enhancing the pressure drop characteristics of the oil separator as a whole when compared to separators where enlarged portion 50 is not employed.

The use of baffle 52 mounted interior of housing 12 which, in cooperation with the inner wall of housing 12 defines passages 62, is likewise advantageous in that baffle 52 effectively separates the interior of housing 12 into a first portion 58 and a second portion 60. Baffle 52 might alternatively itself define flow passages and be circular in nature, fitting directly into the circular cross section of the interior of cylindrical housing 12.

Portion 58 of housing 12 can be characterized as a separation chamber while portion 60 can be characterized as a collecting chamber with sump 16 being defined in the latter. Use of baffle 52 shortens the required height of housing 12 by reducing the distance between the inlet to the discharge piping in the interior of housing 12 (whether it be the entrance to enlarged portion 50 or the entrance to pipe 26 where an enlarged portion is not used) and the surface of sump 16.

In that regard, a dynamic oil separation process occurs in portion 58 of housing 12 in which baffle 52 plays an active part through its physical interaction with the gas stream and lubricant flowing into and through that portion of the housing. Portion 60 and sump 16 of housing 12 are maintained relatively quiescent due to their being shielded by baffle 52 from the dynamic separation process which is ongoing in portion 58. As a result, the standoff distance between the entrance to the discharge piping in housing 12 and the surface of sump 16 is reduced.

It will be appreciated that the use of enlargement 50 or baffle 52 separately of each other or their use in combination with the separator embodiment of FIGS. 1–5 is contemplated. It must also be appreciated that the oil separator apparatus of the present invention will be operable and effective if discharge conduit 26 penetrates the lower portion rather than the upper portion of housing 12 and extends upward through sump 16 so that its open end 32 opens upwardly into the interior of the housing. In that case, inlet 20 to housing 12 would be disposed between the upwardly opening end 32 of the discharge piping and the surface of sump 16. Penetration of the lower rather than the upper portion of the housing by the discharge conduit may be advantageous in instances where the disposition of oil separator 10, in the context of its use or application in a particular refrigeration system or apparatus, makes such disposition of the discharge piping advantageous from a packaging or pipe routing standpoint. Finally, in the embodiment of FIGS. 6 and 7, the case is illustrated where inlet conduit 24 does not pass into the interior of housing 12 which may be advantageous under some design circumstances as has been indicated above.

While the refrigeration system oil separator of the present invention has been disclosed in a preferred embodiment, it will be appreciated that various modifications thereto may be made within its scope. Therefore, the scope of the present invention is to be limited only in accordance with the language of the claims which follow.

What is claimed is:

1. An oil separator for use in a refrigeration system, where the system employs a compressor, comprising:

a discharge conduit having an open end; and a generally cylindrical vertically upstanding housing, said discharge conduit penetrating and extending into the interior of said housing, the centerlines of said discharge conduit and said housing being generally parallel but offset from each other, said housing defining an inlet which opens tangentially into the interior of said housing at a location vertically between said open end of said discharge conduit and the location at which said discharge conduit penetrates said housing, flow through said inlet into the interior of said housing being unimpeded by said discharge conduit, the unobstructed width of said inlet being limited by the maximum distance between said discharge conduit and the inner side wall of said housing.

2. The oil separator according to claim 1 wherein the open end of said discharge piping is downward facing and said inlet opens tangentially into the interior of said housing at a location above said open end of said discharge conduit.

3. The oil separator according to claim 2 wherein said inlet, taken in cross section with respect to the direction of flow of a mixture entering said housing through said inlet, is circular and further comprising conduit connecting said compressor to said housing inlet, said connecting conduit terminating in said inlet without penetrating into the interior of said housing.

4. The oil separator according to claim 3 wherein said housing includes a cap, said cap closing the upper end of said housing and being penetrated by said discharge conduit.

5. The oil separator according to claim 4 wherein said cap defines said housing inlet.

6. The oil separator according to claim 2 wherein said inlet is penetrated by inlet conduit connecting said compressor to said housing, said inlet conduit penetrating into the interior of said housing to a position proximate said discharge conduit.

7. The oil separator according to claim 1 wherein said discharge conduit opens downwardly into and has an enlarged distal end interior of said housing, said distance between the discharge conduit and the inner side wall of said housing being a distance measured other than from said enlarged distal end of said discharge conduit.

8. The oil separator according to claim 7 wherein said housing defines a sump and further comprising a permeable baffle disposed interior of said housing between said distal end of said discharge conduit and said sump.

9. The oil separator according to claim 7 wherein said enlarged distal end of said discharge conduit is a discrete member attached to said discharge piping.

10. The oil separator according to claim 1 wherein said housing defines an oil sump and further comprising a baffle which is open to flow, said baffle being disposed interior of said housing between said open end of said discharge conduit and said sump.

11. A refrigeration system comprising:

a condenser;

means for metering refrigerant, said metering means being in flow communication with said condenser;

an evaporator, said evaporator being in flow communication with said metering device;

a compressor, said compressor being in flow communication with said evaporator and discharging, in operation, a mixture of refrigerant gas in which oil is entrained;

an oil separator, said oil separator having a generally cylindrical vertically upstanding housing in the lower portion of which an oil sump is defined, said housing defining a discharge outlet and an inlet, said inlet defining a flow area opening tangentially into the interior of said housing with respect to the centerline of said housing and said outlet being in a plane generally perpendicular to the centerline of said housing;

discharge conduit penetrating into the interior of said oil separator housing through said outlet and connecting the interior of said housing for flow to said condenser, the centerline of said discharge conduit being parallel to but offset from the centerline of said housing and the flow of said mixture into the interior of said separator through said inlet being unimpeded by said discharge conduit, the width of said flow area, taken in cross section with respect to the direction of flow of said mixture as it enters said housing, being constrained, in order that the entry of said mixture into the interior of said housing be unimpeded by said discharge conduit, only by the maximum distance between said discharge conduit and the inner side wall of said housing;

inlet conduit connecting said compressor to said oil separator inlet so that said mixture of oil and refrigerant gas discharged from said compressor in operation is delivered tangentially into the interior of said separator housing; and conduit means connecting said sump to said compressor.

12. A refrigeration system according to claim 11 wherein said discharge conduit has an enlarged distal end interior of said separator.

13. The refrigeration system according to claim 11 further comprising a baffle member disposed between the distal end of said discharge conduit and said oil sump.

14. The refrigeration system according to claim 11 wherein said discharge outlet is disposed in the upper portion of said housing, wherein said discharge conduit opens downwardly into the interior of said housing and wherein said housing includes a cap, said cap closing the upper end of said housing and defining said inlet and said discharge outlet, said inlet conduit terminating in said cap without penetrating into the interior of aid housing.

15. The refrigeration system according to claim 14 wherein said discharge conduit opens into the interior of said housing at a location below said housing inlet.

16. The refrigeration system according to claim 14 wherein said cap defines said inlet to said separator housing.

17. The refrigeration system according to claim 11 wherein said conduit means connecting said compressor to said oil separator inlet penetrates into the interior of said oil separator housing to a position proximate said discharge conduit.

18. The refrigeration system according to claim 11 wherein said discharge conduit opens downwardly into and has an enlarged distal end interior of said separator and further comprising a baffle member disposed between the distal end of said discharge conduit and said oil sump, said distance between the discharge conduit and the inner side wall of said housing being a distance measured other than from said enlarged distal end of said discharge conduit.

19. A method of reducing pressure drop in a mixture of refrigerant gas-oil discharged from a compressor in a refrigeration system comprising the steps of:

disposing a vertically upstanding cylindrical oil separator housing in the vicinity of said compressor;

penetrating said housing with open ended discharge conduit connecting the interior of said housing to the system condenser, the axes of said conduit and said housing being parallel to but offset from each other;

defining a tangential inlet into said housing between the open end of said conduit and the location at which said conduit penetrates said housing, the inlet being unobstructed by the conduit connecting the interior of the housing to the system condenser and the unobstructed width of said inlet being limited only by the maximum distance between the discharge conduit and the inner side wall of the housing.; and connecting said compressor for flow to said housing inlet.

20. The method according to claim 19 wherein said inlet is defined in the upper portion of said housing, wherein said open end of said conduit opens downwardly into the interior of said housing and further comprising the step of providing an enlarged entryway, interior said housing, to the open end of said discharge conduit.

21. The method according to claim 19 further comprising the steps of defining an oil sump in the separator housing and disposing a baffle member between the oil sump and the conduit which connects the interior of the housing to the system condenser.

* * * * *